(12) United States Patent
Hood

(10) Patent No.: US 9,774,056 B2
(45) Date of Patent: Sep. 26, 2017

(54) FUEL CELL STACK ASSEMBLY

(71) Applicant: Intelligent Energy Limited, Loughborough (GB)

(72) Inventor: Peter David Hood, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 45 days.

(21) Appl. No.: 14/397,780

(22) PCT Filed: Apr. 30, 2013

(86) PCT No.: PCT/GB2013/051107
§ 371 (c)(1),
(2) Date: Oct. 29, 2014

(87) PCT Pub. No.: WO2013/164600
PCT Pub. Date: Nov. 7, 2013

(65) Prior Publication Data
US 2015/0086900 A1 Mar. 26, 2015

(30) Foreign Application Priority Data

May 1, 2012 (GB) .................................. 1207568.5

(51) Int. Cl.
*H01M 8/24* (2016.01)
*H01M 8/248* (2016.01)
(Continued)

(52) U.S. Cl.
CPC ............ *H01M 8/248* (2013.01); *H01M 8/006* (2013.01); *H01M 2008/1095* (2013.01)

(58) Field of Classification Search
CPC ......... H01M 8/248; H01M 2008/1095; H01M 8/006
See application file for complete search history.

(56) References Cited

U.S. PATENT DOCUMENTS 5,009,968 A 4/1991 Guthrie et al.
5,658,200 A 8/1997 Ellis
(Continued)

FOREIGN PATENT DOCUMENTS

CN 1953254 4/2007
EP 2306577 4/2011
(Continued)

OTHER PUBLICATIONS

GB Search Report dated Jul. 7, 2012, issued in GB Patent Application GB1207568.5.
(Continued)

*Primary Examiner* — Muhammad Siddiquee
(74) *Attorney, Agent, or Firm* — Baker & Hostetler LLP

(57) ABSTRACT

A fuel cell stack assembly comprises a plurality of fuel cells in a stack, the stack defining two opposing parallel end faces. An end plate is disposed at each opposing end face of the stack. Each end plate defines a compression surface adjacent to and in compressive relationship with a respective one of the two opposing parallel end faces. A coupling mechanism is attached to the end plates to thereby maintain the fuel cells in the stack under compression. At least one, preferably both, of the end plates comprise a preformed element defining the compression surface, the preformed element being configured with a predetermined curvature such that the compression surface is a convex surface when the preformed element is not under load whereas, under the application of the load to maintain the fuel cells under compression, flexure of the preformed element between elements of the coupling mechanism causes the compression surface to become a substantially planar surface. This provides uniform pressure distribution across the end faces of the fuel cell stack using fewer and lighter weight components.

18 Claims, 3 Drawing Sheets

(51) Int. Cl.
*H01M 8/00* (2016.01)
*H01M 8/1018* (2016.01)

(56) References Cited

U.S. PATENT DOCUMENTS

| | | | |
|---|---|---|---|
| 6,040,072 | A | 3/2000 | Murphy et al. |
| 6,218,039 | B1 | 4/2001 | Mease et al. |
| 6,645,659 | B2 | 11/2003 | Bisaka et al. |
| 6,689,503 | B2 | 2/2004 | Yang |
| 7,776,488 | B2 * | 8/2010 | Evertz ............... H01M 8/0247 429/507 |
| 8,597,820 | B2 | 12/2013 | Hirsch et al. |
| 2002/0061430 | A1 | 5/2002 | Wakahoi et al. |
| 2003/0203269 | A1 * | 10/2003 | Rock ............... H01M 8/2475 429/535 |
| 2005/0249998 | A1 | 11/2005 | Minas et al. |
| 2005/0250005 | A1 * | 11/2005 | Bacon ............... H01M 2/0207 429/152 |
| 2006/0194094 | A1 | 8/2006 | Evertz et al. |
| 2009/0162726 | A1 | 6/2009 | Ozgur et al. |
| 2009/0246588 | A1 | 10/2009 | Tseng et al. |
| 2010/0086810 | A1 | 4/2010 | Hood et al. |
| 2010/0122461 | A1 | 5/2010 | Minas et al. |
| 2011/0123894 | A1 | 5/2011 | Erikstrup et al. |
| 2011/0281190 | A1 * | 11/2011 | Skinkle ............... H01M 8/04014 429/433 |
| 2012/0028159 | A1 | 2/2012 | Nielsen et al. |
| 2012/0196168 | A1 * | 8/2012 | Hirsch ............... H01M 2/1083 429/99 |

FOREIGN PATENT DOCUMENTS

| | | |
|---|---|---|
| JP | H06-231794 | 8/1994 |
| JP | 2002063930 | 2/2002 |
| JP | 2004-288539 A | 10/2004 |
| JP | 2004288539 | 10/2004 |
| JP | 2005-127353 A | 5/2005 |
| JP | 2005141935 | 6/2005 |
| JP | 2008-311165 A | 12/2008 |
| JP | 2009-117326 A | 5/2009 |
| JP | 2013-501333 A | 1/2013 |
| WO | 03044885 | 5/2003 |

OTHER PUBLICATIONS

International Search Report and Written Opinion dated Oct. 11, 2013, issued in International Patent Application PCT/GB2013/051107.
Singapore Patent Application No. 11201407109R; Written Opinion; dated Feb. 8, 2016; 11 pages.
Singapore Patent Application No. 11201407109R; Written Opinion; dated Jul. 29, 2015; 12 pages.

* cited by examiner

FUEL CELL STACK ASSEMBLY

This Patent Application claims priority to International Patent Application PCT/GB2013/051107, filed Apr. 30, 2013, and United Kingdom Patent Application GB1207568.5, filed May 1, 2012, the contents of which are incorporated by this reference as if fully set forth herein in their entirety.

The present invention relates to methods and apparatus suitable for assembling an electrochemical fuel cell stack.

Fuel cell stacks comprise a series of individual fuel cells built up layer by layer into a stack arrangement. Each cell itself may include various layered components such as a polymer electrolyte membrane, gas diffusion layers, fluid flow plates and various sealing gaskets for maintaining fluid tightness and providing fluid fuel and oxidant distribution to the active surfaces of the membrane. At each end face of the stack, a pair of pressure end plates coupled together by tie rods is conventionally used to hold the stack together and maintain compression on the cells in the stack.

It is most important that pressure applied by the end plates to the ends of the fuel cell stack is sufficiently uniform across the surfaces of the stack that all of the individual components of the stack are maintained in proper compressive relationship with one another. Sealing gaskets in particular must be maintained in proper compression across the entire area of each fuel cell to ensure that fluid flow paths are properly defined no that fuel and/or oxidant are correctly conveyed to the active surfaces of each cell and do not leak.

Conventionally, uniform pressure is maintained by providing substantial and robust end plates capable of maintaining sufficient excess pressure across the entire surfaces of the ends of the stack. This results in large and heavy end plates to ensure that they are sufficiently robust that they will not significantly distort under the requisite pressures and will not apply compression forces unevenly. Use of large and heavy end plates results in heavier and larger fuel cell stacks than is desirable. An alternative approach is to use lighter weight end plates but provide an additional mechanism for mitigating the effects of end plate structure distortion when compressive forces are applied.

An approach described in U.S. Pat. No. 6,040,072 is to use bands or straps surrounding the fuel cell stack to transmit load via the end plates and an array of adjustable elements that control the distribution of the compressive load, to minimize the size and weight of the clamping mechanism.

Another approach is described in US 2006/0194094 which uses an end plate having a pressure shield which is curved convexly towards the stack and a bearing plate which is curved concavely towards the pressure shield. The bearing plate acts as a transition element from the convexly curved pressure shield to the next planar element of the stack of fuel cells so as to transmit only the desired compressive forces to the planar element of the fuel cell stack.

Both of these documents recognise the importance of maintaining a uniform pressure distribution. However, both documents propose solutions that involve introducing additional elements to the end plate assembly in order to compensate for flexure in the end plates when the fuel cell stack assembly is placed under compression.

It is an object of the present invention to provide an improved way of ensuring uniform pressure distribution across the end faces of a fuel cell stack using lighter weight end plates. It is a further object of the present invention to provide a fuel cell stack assembly having simplified construction and reduced component count. Some or all of the objects may be achieved by one or more embodiments of the invention.

According to one aspect, the present invention provides a fuel cell stack assembly comprising:

a plurality of fuel cells in a stack, the stack defining two opposing parallel end faces;

an end plate at each opposing end face of the stack, each and plate defining a compression surface adjacent to and in compressive relationship with a respective one of the two opposing parallel end faces;

a coupling mechanism attached to the end plates to thereby maintain the fuel cells in the stack under compression;

wherein at least one of the end plates comprises a preformed element defining the compression surface, the preformed element being configured with a predetermined curvature such that the compression surface is a convex surface when the preformed element is not under load whereas, under the application of the load to maintain the fuel cells under compression, flexure of the preformed element between elements of the coupling mechanism causes the compression surface to become a substantially planar surface.

The coupling mechanism may comprise a pair of clips, one or each clip including an engagement member configured to engage with one of a pair of opposing edges of the preformed element, one or each clip configured to extend along the respective edge of the preformed element. One or each clip may extend along a substantial proportion of the respective edge of the preformed element. The preformed element may have a recess in the surface adjacent to each of the pair of opposing edges for engagement with and retention of a respective one of the clips. One or each clip may comprise a C-shaped clip. The compression surface of the preformed element may be convex along a line extending between said pair of opposing edges and may be planar along a line extending parallel with said pair of opposing edges. One or each clip may exhibit elastic behaviour sufficient to enable a snap fit of the clip onto a respective recessed edge of the preformed element. One or each clip may extend in a plane orthogonal to the parallel end faces of the stack and one or each clip may be configured to exhibit said elastic behaviour to flex out of said plane. One or each clip may extend along a longitudinal axis between planes defined by the parallel end faces of the stack, and one or each clip may be configured to exhibit said elastic behaviour to stretch along the longitudinal axis. One or each clip may comprise a meander structure along the longitudinal axis configured to provide elasticity along the longitudinal axis. Both of said end plates may comprise a preformed element as defined in any of the examples above.

According to another aspect, the present invention provides a method of assembling a fuel cell stack assembly comprising:

layering a plurality of fuel cells in a stack, the stack defining two opposing parallel end faces;

disposing an end plate at each opposing end face of the stack, each end plate defining a compression surface adjacent to a respective one of the two opposing parallel and faces, in which at least one of the end plates is a preformed element with a predetermined curvature such that the compression surface is a convex surface when the preformed element is not under load;

attaching a coupling mechanism to the and plates to thereby bring the and plate compression surfaces into compressive relationship with the opposing parallel end faces of the stack and thereby maintain the fuel cells in the stack under compression, the application of the load causing flexure of the at least one preformed element causing the compression surface to become a substantially planar surface under the load of the assembled stack assembly.

According to another aspect, the present invention provides a fuel cell stack assembly comprising:

a plurality of fuel cells in a stack, the stack defining two opposing parallel end faces;

an end plate assembly at each opposing end face of the stack, each end plate assembly defining a compression surface adjacent to and in compressive relationship with a respective one of the two opposing parallel end faces;

a coupling mechanism attached to the end plates to thereby maintain the fuel cells in the stack under compression, wherein the coupling mechanism comprises a clip extending along a longitudinal axis between planes defined by the parallel end faces of the stack, and each clip is configured to exhibit said elastic behaviour to stretch along the longitudinal axis.

Each clip may comprise a meander structure along the longitudinal axis configured to provide elasticity along the longitudinal axis.

Embodiments of the present invention will now be described by way of example and with reference to the accompanying drawings in which.

The fuel cell stack assemblies described in this disclosure are particularly, though not exclusively, suited for fuel cells in electronic consumer products where it is desirable to deploy a design that is suitable for mass production, reduction of weight, simplification of construction and reduction in cost. In addition, the assemblies described here are particularly, though not exclusively, suited for air cooled or open cathode fuel cell stacks which require open and uninterrupted access to the cathode assemblies to promote uniform and laminar air flow and air distribution over the cathode electrodes. Conventional fixings such as tie rods or tie bars spanning cathode assemblies in the fuel cell stack can create disruption to air flow. The fuel cell stack end plates described here ensure a uniformly applied compaction pressure applied over the surface area of the fuel cell electrodes.

These benefits are achieved without large mechanical end plate assemblies that resist the deflection created by a uniform compaction force needed over the electrode. The arrangements described herein are particularly beneficial for smaller stack assemblies required in miniaturized electronic products, where the end plate assemblies can become disproportionately large in relation to the fuel cell stack proportions.

The designs of fuel cell stack assembly described here are achieved with reduced end plate component count, requiring minimal manufacture processing and use of relatively low technology materials. The process of manufacture can be a low cost mechanized assembly process that promotes repeatability.

The end plate assemblies described herein also provide for thermal expansion and contraction allowances.

Figure 1:
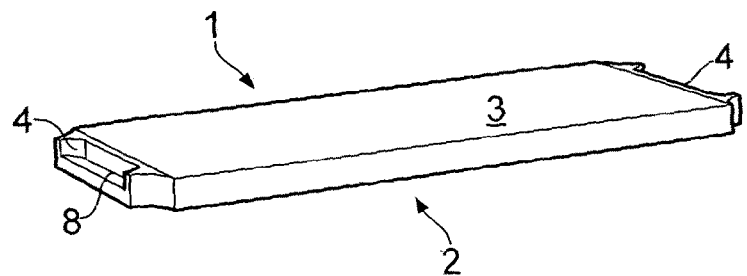
FIG. 1 shows a perspective view of a preformed end plate for use with a fuel cell stack.

With reference to FIG. 1, the end plates 1 of the fuel cell stack each comprise a single preformed sheet of elastic material such as spring steel. FIG. 1 shows a top end plate 1 for a fuel cell stack 10, 40 as depicted each of FIGS. 2 to 4. Each end plate 1 includes a compression face 2 which bears against the end face of a fuel cell stack 10, and an outer face 3 (the top face of the end plate 1 depicted in FIG. 1) that faces away from the body of the fuel cell stack 10. Each end plate 1 is fabricated as a near-planar sheet but with a preformed curvature such that the compression face 2 (the downward face in FIG. 1) is somewhat convex when the end plate is unloaded/unbiased. For a sheet of generally uniform thickness of the major surface area, the outer (top) face 3 will than be concave. However, if the end plate 1 sheet is not of uniform thickness, the outer (top) face 3 could have a flat or convex surface, notwithstanding the convex compression face 2. The end plate 1 also includes an engagement surface 4 at each of two opposing edges, which will be described in further detail hereinafter.

Figure 2:
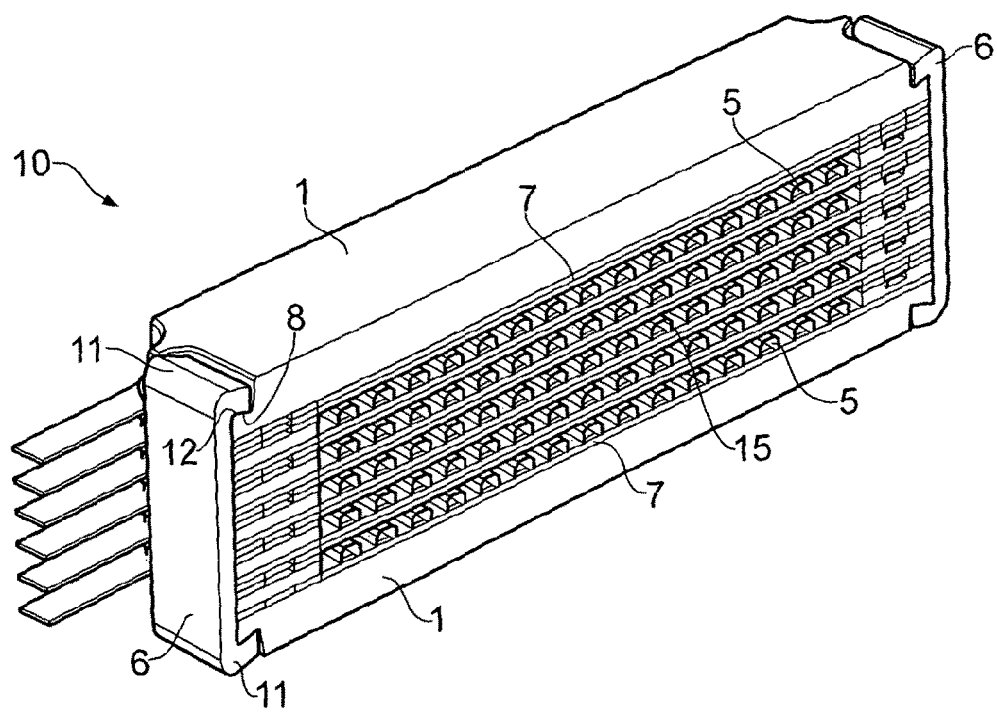
FIG. 2 shows a perspective sectional view of an open sided, air cooled fuel cell stack deploying preformed end plates and C-clip coupling mechanism.
Figure 3:
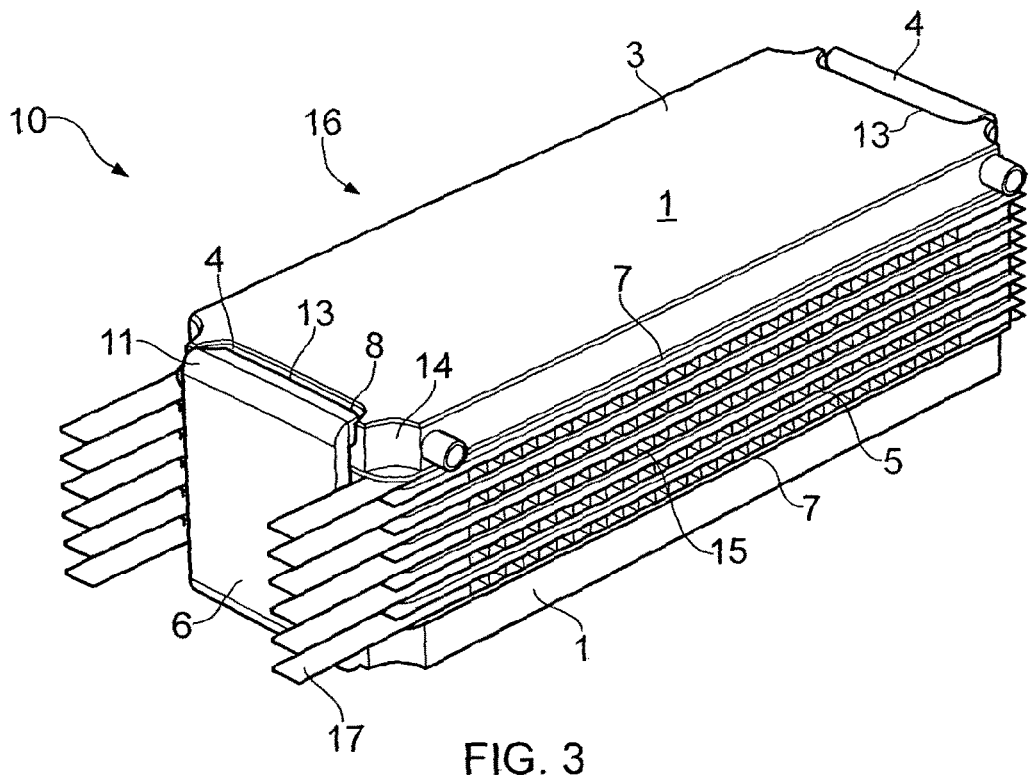
FIG. 3 shows a perspective view of the open sided, air cooled fuel cell stack of FIG. 2.

FIG. 2 shows a cross-sectional view through an assembled fuel cell stack 10 and FIG. 3 shows the complete fuel cell stack. A pair of preformed end plates 1 is shown in position providing a compression mechanism for maintaining a plurality of fuel cell plates 5 in the stack in compressive parallel relation to one another. A coupling mechanism in the form of two C-clips 6 maintains the end plates in position. As seen in FIG. 3, the stack includes open air flow faces 15 (in front) and 16 (behind). These faces provide air inlet and air outlet faces of an open cathode fuel cell stack.

It is a particular feature that each end plate 1 is fabricated of a sufficiently stiff, but elastic material such that at the desired compressive loading of the fuel cell plates 5 during assembly brings each unloaded convex compression face 2 into a substantially planar disposition. The application of the coupling mechanism, e.g. C-clips 6, results in flexure of each of the end plates 1 such that the compression faces 2 become both planar, and relatively parallel to one another, thereby imparting correct uniform pressure on both end faces 7 of the fuel cell stack. The thickness, stiffness and elastic deformability out-of-plane for each of the preformed end plates 1 is chosen to ensure that planar and uniform pressure is imparted to the stack 10. In summary, the expression "preformed" end plates 1 is intended to indicate that the end plates are given a predetermined curvature under no load such that they will assume a flat and parallel relationship to one another at the required fuel cell stack assembly compaction pressure. The predetermined curvature under no load may be chosen such that it allows for an initial break-in and settling of the stack assembly during assembly and commissioning. In a fuel cell stack assembly, there may be a short period before or during commissioning in which the stack compresses slightly, e.g. as a result of plastic deformation of layers such as the diffusion layer or various gaskets. The predetermined curvature of the end plates under no load may be configured to accommodate this such that they assume a flat and parallel relationship to one another after commissioning of the fuel cell stack.

During assembly, at the required assembly dimension the C-clips 6 are applied to each side and each end of the fuel cell stack, effectively anchoring the end plates 1 to one another. In a general aspect, each end plate 1 includes a coupling feature for engaging with a coupling mechanism for maintaining the fuel cell stack under compression. In the arrangement shown in FIGS. 2 to 4, the coupling mechanism comprises C-clips 6. Each end plate 1 includes a portion 8 of the surface 3 which is recessed, extending along the two opposing edges 13 to which the C-clips will be attached. In the arrangement shown, the recessed portion 8 is in the form of a "reverse bevel" in the outer surface 3.

The C-clips 6 each have a reverse registering angle in each of the curved ends 11 that corresponds with the reverse bevel angle, thereby defining an angled face 12 that mates with the recessed portion 8 of the end plate 1. This angle provides a snap fit for engaging the C-clips onto the plates and also provides a fouling resistance to the clips 6 so as to resist accidental disengagement of the clips 6 from the end plates 1.

It can be seen in FIGS. 2 and 3 that the C-clips 6 each extend along opposing edges 13 of the preformed end plates preferably along a substantial proportion thereof thereby providing a compression force along a major portion of the opposing edges 13. This ensures a uniform compression force along the opposing edges. However, the C-clips leave exposed the full surface area of air flow faces 15, 16. The C-clips may extend along the opposing edges 13 leaving exposed corner portions 14 which can be used to allow egress of cell voltage monitoring tabs 17 from one or more cells 5 in the stack. This is achieved while still maintaining the air flow faces 15, 16 free of obstructions. In other arrangements, the C-clips need no be entirely continuous along the opposing edges 13 but could be intermittent provided that there is sufficient extent of retention on the end plates 1 to ensure that the and plates are maintained in a planar condition under the assembled compression loading on the end plates.

In a preferred arrangement, the preformed curvature in the end plates 1 is convex in one dimension, along a line extending between the pair of opposing edges 13 that have the engagement surfaces 4, e.g. in the x-direction as shown in FIG. 2. By contrast, the end plates 1 are planar in both the unbiased and biased states along a line extending parallel with the pair of opposing edges 13, e.g. in the y-direction as shown in FIG. 2. The clips 6 therefore only need to flex the and plates end to end (along the x-direction) to impose planarity of the end plates. However, in other arrangements, the convexity could be in two dimensions, e.g. along both the x- and y-directions.

Although the engagement mechanism for the C-clips 6 to the end plates 1 is shown as a recess 8 in the outer face 3 of the end plate 1, the configuration could be reversed to provide an upstanding portion in the outer face 3 of the end plate 1 and a corresponding recess in the C-clip curved ends 11 or a latching lug on the ends of the C-clips 6 which has to frictionally pass an upstanding portion. The skilled person is readily able to implement various possible structures which provide a retention force or suitable detent retaining the C-clips in place.

Each of the clips 6 is configured to exhibit elastic behaviour sufficient to enable a snap fit of the clip 6 onto the respective recessed edge of the preformed end plate. This elastic behaviour preferably includes a flexibility of the clip out of a longitudinal plane extending between the opposing edges 13 of the stack 10. Such flexing effectively opens the "jaws" of the C-clip defined by the curved ends 11. Thus, in a general aspect, each C-clip 6 extends in a plane orthogonal to the parallel end faces 7 of the stack 10 and each C-clip 6 is configured to exhibit the elastic behaviour to flex out of that plane.

FIGS. 2 and 3 demonstrate that the entire fuel cell end plate assembly and coupling mechanism can be provided in just four components that have been particularly fabricated such that at the correct compression loads, uniform pressure will be applied across the entire surface area of the parallel end faces of the stack. This represents a considerable cost saving and simplicity of manufacture and assembly that the complex, multi-part end plate assemblies described in the prior art referenced above.

During operation of a fuel cell stack, heating of the cells occurs as a function of the electrical load on the cell. This causes thermal expansion and contraction of the fuel cell stack during normal operation. Thermal expansion and contraction of the fuel cell stack is accommodated by the end plate 1 component being in a state of sprung suspension. The C-clip secured ends may be more dimensionally constrained in the design of FIGS. 2 and 3, but this is over the manifold regions of the fuel cell plates and so has a more limited effect. However, an advanced design of C-clip can be made to accommodate a greater allowance for thermal expansion and contraction of the fuel cell stack. Such a design is shown in FIG. 4.

Figure 4:
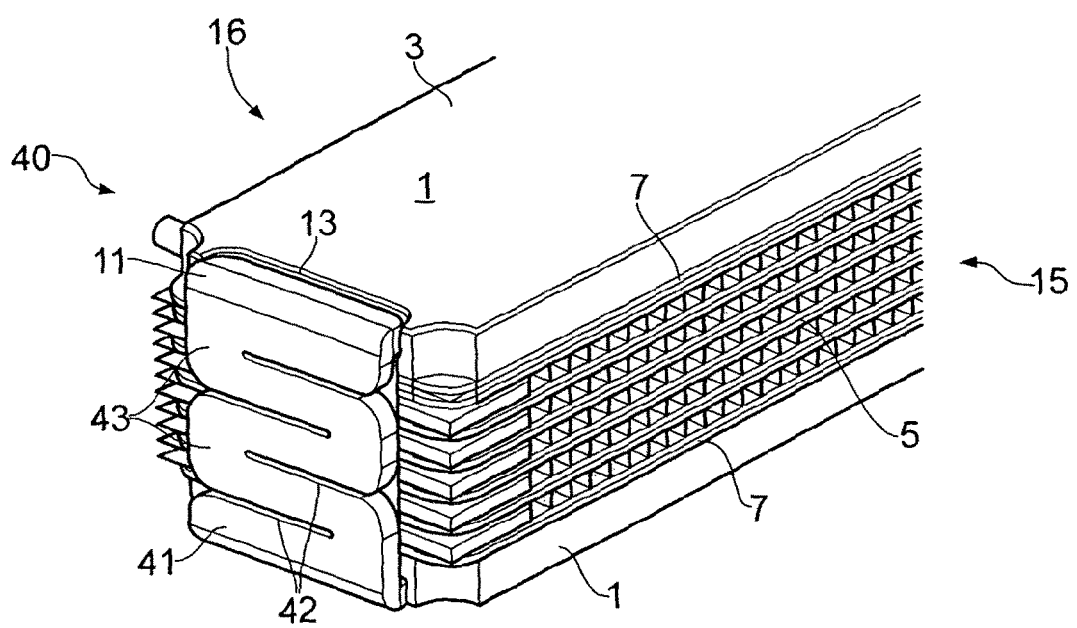
FIG. 4 shows a perspective view of an open sided, air cooled fuel cell stack deploying preformed end plates and a flexible clip allowing dimensional compliance.

FIG. 4 shows a fuel cell stack 40 in which each C-clip 41 is fabricated as a meandering structure comprising a series of slits 42 and bends 43 allowing for longitudinal elastic expansion and contraction of the C-clip 41. The meandering structure should be designed so as to provide an appropriate degree of expansion and contraction ideally matching that required by the fuel cell stack under normal thermal cycling, while maintaining optimal or near-optimal compression forces on the preformed and plates 1 such that they maintain substantially plane parallel relationship against their respective end faces 7 of the fuel cell stack. In other respects, the design options and alternatives for the C-clips 41 can be similar to those described in connection with the C-clips 6 of FIGS. 2 and 3.

In a general aspect, each C-clip 41 extends along a longitudinal axis between planes defined by the parallel end faces 7 of the stack 40, and each C-clip 41 is configured to exhibit an elastic behaviour to flex, i.e. stretch, along the longitudinal axis.

This general aspect can be realised by alternatives to the meandering structure shown in FIG. 4. For example, the C-clips could be implemented as structures with apertures or contours out of plane rather than slits allowing longitudinal expansion and contraction under thermal cycling of the fuel cell stack.

Alternative methods of engaging the clips with the preformed end plates 1 could include spot welding, threaded fixings, rivets or the like.

Alternative methods of providing a coupling mechanism attached to the preformed end plates to maintain the fuel cells in the stack under compression could include spot welded strips or rods, threaded fixings, rivets or straps/bands.

The general aspect in which each C-clip 41 extends along a longitudinal axis between planes defined by the parallel end faces of a fuel cell stack 40 and each C-clip is configured to exhibit an elastic behaviour to flex, i.e. stretch, along the longitudinal axis can be used in other contexts. For example, with reference to FIG. 5, and end plate and compression assembly 50 is shown in which the C-clips 51 include more than one meandering structure 52 comprising a series of slits 53 and bends 54 allowing for longitudinal elastic expansion and contraction of the C-clip 51. In common with the example of FIG. 4, the meandering structure 52 should be designed so as to provide an appropriate degree of expansion and contraction ideally matching that required by the fuel cell stack under normal thermal cycling, while maintaining optimal or near-optimal compression forces on end plates 55 such that they maintain substantially plane parallel relationship against respective end faces of a fuel cell stack (not shown in FIG. 5).

Figure 5:
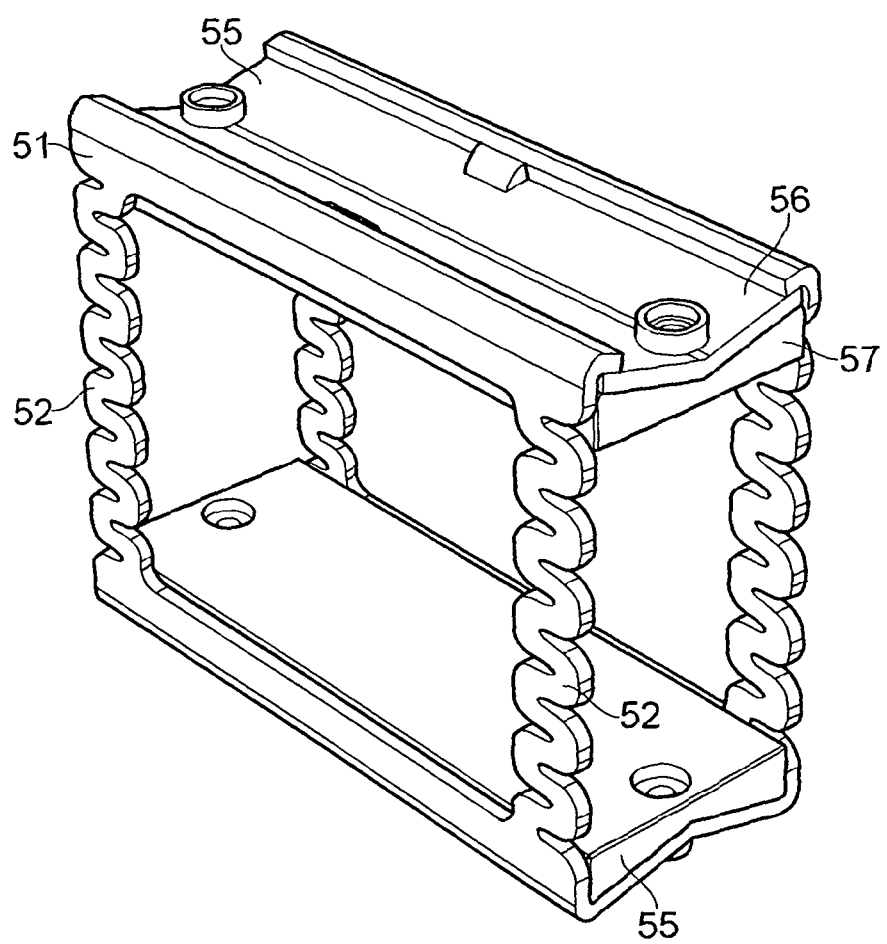
FIG. 5 shows a perspective view of an end plate and clip assembly for allowing dimensional compliance.

The general aspect in which each C-clip 41 extends along a longitudinal axis between planes defined by the parallel and faces of a fuel cell stack 40 and each C-clip is configured to exhibit an elastic behaviour to flex, i.e. stretch, along the longitudinal axis can also be used for alternative end plate arrangements such as those shown in FIG. 5. The end plates 55 could comprise multi-part end plates including a master plate 56 and a slave plate 57 against which the master plate bears in compression.

A further benefit of the preformed end plates described here is that the lower mass of the end plates compared with conventional, heavy duty end plates avoids having a large thermal mass at each end of the stack. A large thermal mass at each end of the stack can result in thermal lag in the heating and cooling of one or more cells in the stack adjacent to the end plates. This can adversely affect performance of the lagging cells. The preformed, light weight end plates described can be configured to have little thermal effect on the end-most cells in the stack, thereby unifying the dynamic thermal response of the electrodes in the stack and preventing thermal lag therein. A further consequence is that a thermally isolating layer may not be necessary. As a further alternative, the preformed end plates could be thermally controlled, also providing reduced thermal lag associated with more massive end plates.

Other embodiments are intentionally within the scope of the accompanying claims.

The invention claimed is:

1. An open cathode fuel cell stack assembly comprising:
   a plurality of fuel cells in an open cathode fuel cell stack, the stack defining two opposing parallel end faces and including open air flow faces providing an air inlet face and an air outlet face of the stack, the stack further including fluid flow paths between the air inlet face and the air outlet face;
   an end plate at each opposing end face of the stack, each end plate defining a compression surface adjacent to and in compressive relationship with a respective one of the two opposing parallel end faces; and
   a coupling mechanism attached to the end plates to thereby maintain the fuel cells in the stack under compression, the coupling mechanism comprising two C-shaped clips configured to leave exposed the full surface area of the open air flow faces to promote uniform and laminar air flow and air distribution over a cathode electrode of the open cathode fuel cell stack;
   wherein at least one of the end plates comprises a preformed element defining the compression surface, the preformed element being configured with a predetermined curvature such that the compression surface is a convex surface when the preformed element is not under load whereas, under the application of the load to maintain the fuel cells under compression, flexure of the preformed element between elements of the coupling mechanism causes the compression surface to become a substantially planar surface.

2. The open cathode fuel cell stack assembly of claim 1 in which each C-shaped clip includes an engagement member configured to engage with one of a pair of opposing edges of the preformed element, and each C-shaped clip is configured to extend along the respective edge of the preformed element.

3. The open cathode fuel cell stack assembly of claim 2 in which each C-shaped clip extends along a substantial proportion of the respective edge of the preformed element.

4. The open cathode fuel cell stack assembly of claim 2 in which the preformed element has a recess in the surface adjacent to each of the pair of opposing edges for engagement with and retention of a respective one of the C-shaped clips.

5. The open cathode fuel cell stack assembly of claim 2 in which the compression surface of the preformed element is convex along a line extending between said pair of opposing edges and is planar along a line extending parallel with said pair of opposing edges.

6. The open cathode fuel cell stack assembly of claim 2 in which each C-shaped clip exhibits elastic behaviour sufficient to enable a snap fit of the C-shaped clip onto a respective recessed edge of the preformed element.

7. The open cathode fuel cell stack assembly of claim 6 in which each C-shaped clip extends in a plane orthogonal to the parallel end faces of the stack and each C-shaped clip is configured to exhibit said elastic behaviour to flex out of said plane.

8. The open cathode fuel cell stack assembly of claim 6 in which each C-shaped clip extends along a longitudinal axis between planes defined by the parallel end faces of the stack, and each C-shaped clip is configured to exhibit said elastic behaviour to stretch along the longitudinal axis.

9. The open cathode fuel cell stack assembly of claim 8 in which each C-shaped clip comprises a meander structure along the longitudinal axis configured to provide elasticity along the longitudinal axis.

10. The open cathode fuel cell stack assembly of claim 1 in which both of said end plates comprise a preformed element as defined in any preceding claim.

11. A method of assembling an open cathode fuel cell stack assembly comprising:
    layering a plurality of fuel cells in an open fuel cell stack, the stack defining two opposing parallel end faces and including open air flow faces providing an air inlet face and an air outlet face of the stack, the stack further including fluid flow paths between the air inlet face and the air outlet face;
    disposing an end plate at each opposing end face of the stack, each end plate defining a compression surface adjacent to a respective one of the two opposing parallel end faces, in which at least one of the end plates is a preformed element with a predetermined curvature such that the compression surface is a convex surface when the preformed element is not under load; and
    attaching a coupling mechanism to the end plates to thereby bring the end plate compression surfaces into compressive relationship with the opposing parallel end faces of the stack and thereby maintain the fuel cells in the stack under compression, the application of the load causing flexure of the at least one preformed element causing the compression surface to become a substantially planar surface under the load of the assembled stack assembly,
    wherein the coupling mechanism comprises two C-shaped clips configured to leave exposed the full surface area of the open air flow faces to promote uniform and laminar air flow and air distribution over a cathode electrode of the open cathode fuel cell stack.

12. The open cathode fuel cell stack assembly of claim 1 wherein each C-shaped clip extends along a longitudinal axis between planes defined by the parallel end faces of the stack, and each C-shaped clip is configured to exhibit said elastic behaviour to stretch along the longitudinal axis.

13. The open cathode fuel cell stack assembly of claim 12 in which each C-shaped clip comprises a meander structure along the longitudinal axis configured to provide elasticity along the longitudinal axis.

14. The open cathode fuel cell stack assembly of claim 1, wherein the convex surface has convexity in two dimensions.

15. The open cathode fuel cell stack assembly of claim 14, wherein the two dimensions are orthogonal to one another.

16. The open cathode fuel cell stack assembly of claim 1, in which the fuel cell stack assembly is an air cooled open cathode fuel cell stack assembly.

17. The open cathode fuel cell stack assembly of claim 1, wherein:

each C-shaped clip includes an engagement member configured to engage with one of a pair of opposing edges of the preformed element, and each C-shaped clip is configured to extend along the respective opposing edge of the preformed element while leaving exposed corner portions; and wherein one or more cell voltage monitoring tabs extend from one or more of the fuel cells through one or more of the exposed corner portions.

18. The method of assembling an open cathode fuel cell stack assembly of claim 11, wherein:

the stack further comprises one or more cell voltage monitoring tabs extending from a corner of one or more of the fuel cells;

each C-shaped clip includes an engagement member configured to engage with one of a pair of opposing edges of the preformed element, and each C-shaped clip is configured to extend along the respective opposing edge of the preformed element while leaving exposed corner portions through which the one or more cell voltage monitoring tabs extend.

\* \* \* \* \*